(No Model.) 2 Sheets—Sheet 1.

P. L. KIMBALL.
CENTRIFUGAL SEPARATOR.

No. 566,458. Patented Aug. 25, 1896.

Witnesses
Andrew Ferguson
Frank E. Healy

Inventor
Perley L. Kimball
By W. E. Simonds
Attorney (No Model.) 2 Sheets—Sheet 2.
P. L. KIMBALL.
CENTRIFUGAL SEPARATOR.
No. 566,458. Patented Aug. 25, 1896.
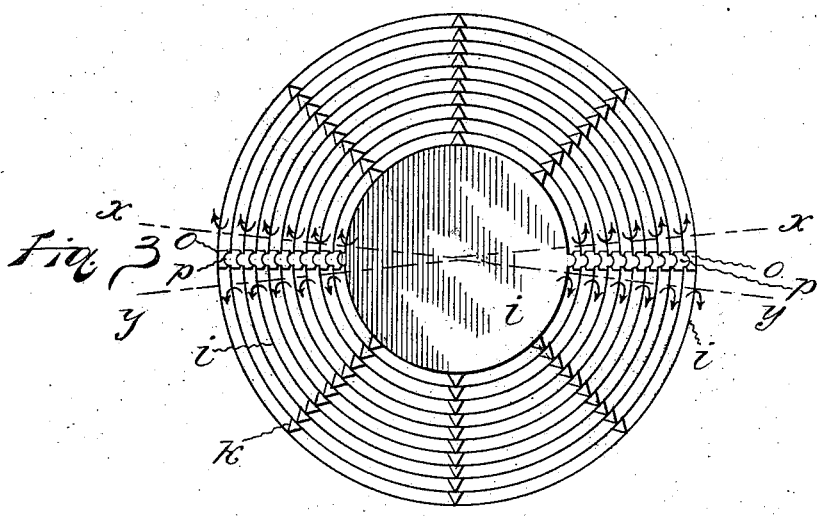
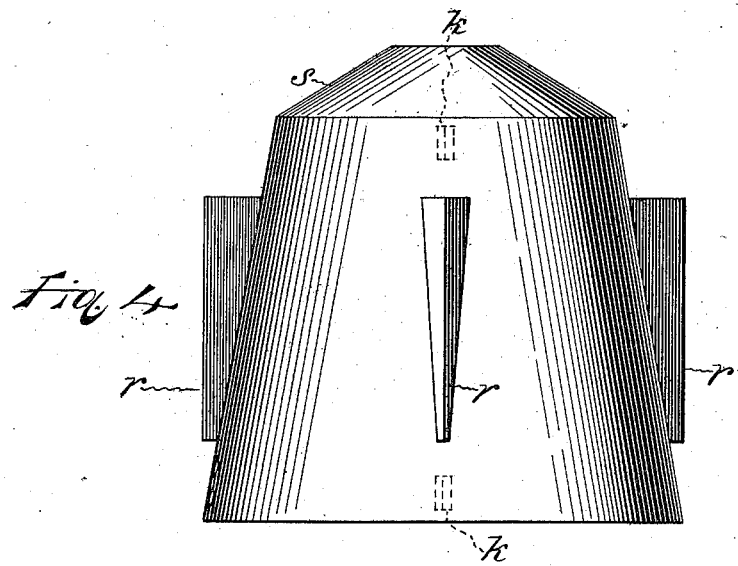
Witnesses
Andrew Ferguson
Frank E. Healy
Inventor
Purley L. Kimball
By W. E. Simonds
Attorney

UNITED STATES PATENT OFFICE.

PERLEY L. KIMBALL, OF BELLOWS FALLS, VERMONT, ASSIGNOR TO THE VERMONT FARM MACHINE COMPANY, OF SAME PLACE.

CENTRIFUGAL SEPARATOR.

SPECIFICATION forming part of Letters Patent No. 566,458, dated August 25, 1896.

Application filed February 25, 1895. Serial No. 539,528. (No model.)

*To all whom it may concern:*

Be it known that I, PERLEY L. KIMBALL, a citizen of the United States of America, residing at Bellows Falls, in the county of Windham and State of Vermont, have invented a certain new and useful Improvement in Centrifugal Separators, of which the following is a description, reference being had to the accompanying drawings, wherein—

Figure 1:
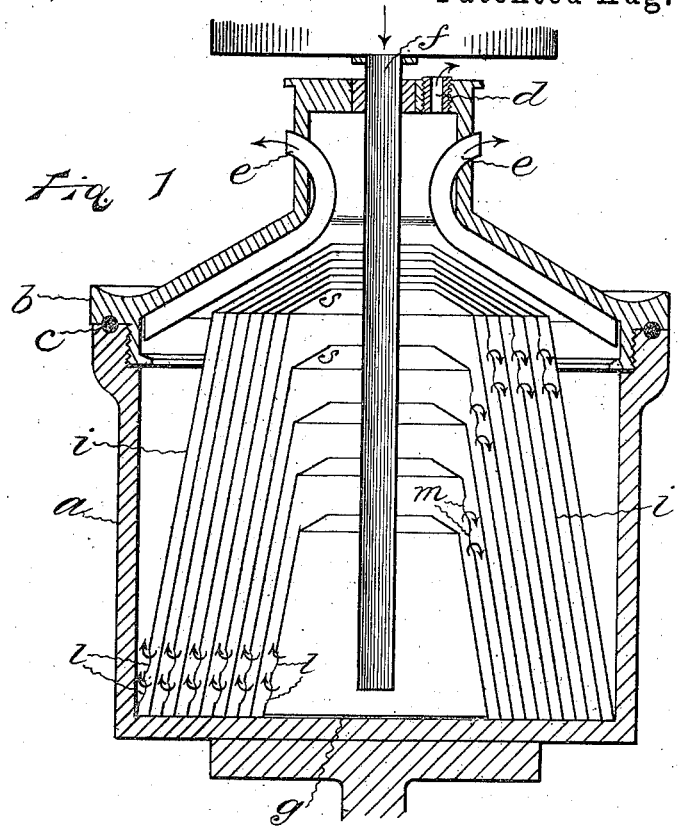
Figure 2:
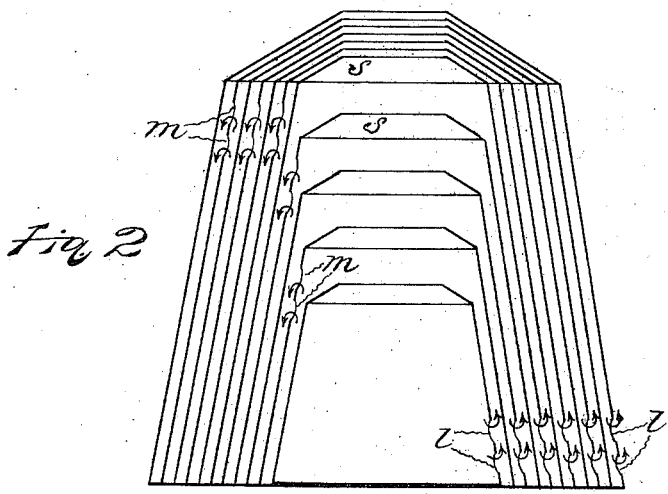

Figure 1 is a view in central vertical section of the material parts of a separator-drum embodying said improvement. The plane of the section is denoted by the dotted line $x\,x$, Fig. 3. Fig. 2 is a view in central vertical section of the nest of conical partitions within the drum on the plane denoted by the dotted line $y\,y$, Fig. 3. Fig. 3 is a bottom view of the nest of conical partitions. Fig. 4 is an elevation view of the nest of conical partitions.

The apparatus shown and described herein is applicable to the separation of intermixed liquids of different densities generally, but will be herein described as applied to the separation of cream from whole milk.

The letter $a$ denotes the swiftly-rotating drum; $b$, the cover screwing upon the same; $c$, a rubber packing at the joint between the two; $d$, the cream-outlet; $e$, the blue milk outlets, and $f$ the feed-pipe where the whole milk enters.

The letters $i$ denote partitions which are conical or substantially conical in form, one within the other. The innermost of the conical partitions has a floor $g$. These conical partitions are separable each from the other and can all be taken out of the drum. They are kept apart by spacing projections $k$, located at numerous suitable points upon the outer surface of each of the conical partitions.

The letters $o$ denote grooved ways on the inner surface of each of the partitions, and the letters $p$ denote corresponding ridges on the outer surface of the partitions, sliding in and coöperating with the grooved ways. Together these ridges and grooves form dams or stops which prevent the milk in any annular chamber from circulating entirely around the whole of the chamber.

The letters $r$ denote wings on the exterior of the outermost conical partition for aiding in keeping the milk rotating with the drum.

The letters $s$ denote flanges at the top or upper end of each of the conical partitions, which serve, for one function, to conduct the cream to or toward the central space of the drum. The dams or stops composed of the parts $o\,p$ divide the annular chambers into two equal sets, each annular chamber comprising about half the circle. This construction results in a set of half-circular chambers, one upon each side of said dams or stops, and each set has its own flow-passages for the liquid.

The whole milk enters through the feed-pipe $f$ and escapes therefrom near the bottom of the drum and within the smallest of the conical partitions. Here the separation of the cream from the blue milk begins immediately. The latter, under centrifugal force, tends to move radially outward, thereby forcing the cream toward the center. The blue milk, carrying with it more or less of the unseparated cream-globules, passes from this innermost chamber through a series of flow-passages $l$, which are near the bottom of the innermost partition, and into the annular chamber, which is between the smallest of the conical partitions and the one next contiguous. Here the blue milk, as before, tends to the outside of this annular chamber, forcing the cream radially inward, and the cream rising finds escape at the top of this annular chamber into the central cream-space. From the annular chamber last spoken of the liquid escapes into the next of the annular chambers through flow-passages $m$ in the next outermost of the conical partitions, which flow-passages $m$ are near the top of that conical partition, and they are also substantially on the opposite side of the center from the flow-passages $l$, an arrangement which makes the flow-passages in each two contiguous partitions substantially out of alinement both vertically and horizontally. From the annular chamber last mentioned the liquid passes through the next outermost of the conical partitions through other flow-passages $l$ near the bottom and substantially opposite the flow-passages m. In this manner the liquid passes from one annular chamber to another outwardly, first going through flow-passages l, which are near the bottom, and then going through flow-passages m, which are not only near the top of the partitions, but substantially opposite from the flow-passages l. In each of these annular chambers more or less separation of cream from blue milk goes on, the cream rising and escaping to join the central cream mass.

The foregoing description of construction and operation applies alike to the two sets of half-circular chambers which are respectively upon opposite sides of the dams or stops before referred to.

Finally the blue milk reaches the inner wall of the drum and escapes from the drum through the blue-milk outlets e, and if there be any cream separated in this final chamber it also rises, moves inward, and joins the central cream mass. The feed of the milk through the feed-pipe f is so regulated that the quantity fed is somewhat less than can radially escape through the flow-passages l of the innermost partition, to the end that all of the milk may pass through these flow-passages last mentioned.

I claim as my improvement—

1. In a centrifugal separator, a plurality of substantially conical partitions, one within the other, all concentric with each other and converging in the same direction, having flow-passages for the liquid through the same which are substantially out of alinement vertically in each of two contiguous partitions, all substantially as described and for the purposes set forth.

2. In a centrifugal separator, a plurality of substantially conical partitions, one within the other and concentric with each other, having flow-passages for the liquid through the same which are substantially out of alinement, both vertically and horizontally, in each two contiguous partitions, all substantially as described and for the purposes set forth.

PERLEY L. KIMBALL.

Witnesses:
PRESTON H. HADLEY,
JOSEPH S. WILLSON.